United States Patent [19]
Powers, Jr.
[11] 3,876,168
[45] Apr. 8, 1975

[54] MOTOR CONTROL FOR TAPE TRANSPORT SYSTEM

[75] Inventor: Gale A. Powers, Jr., Longmont, Colo.

[73] Assignee: Storage Technology Corporation, Boulder, Colo.

[22] Filed: May 15, 1972

[21] Appl. No.: 253,001

[52] U.S. Cl. ................. 242/184; 242/75.51; 318/6; 318/349
[51] Int. Cl. .......................................... G11b 15/58
[58] Field of Search ........... 242/184, 183, 182, 185, 242/75.51, 75.5; 318/6, 7, 81, 94, 423, 504, 508, 479, 493, 514, 348, 349

[56] References Cited

UNITED STATES PATENTS

| | | | |
|---|---|---|---|
| 2,921,753 | 1/1960 | Lahti et al. | 242/184 |
| 3,137,453 | 6/1964 | Wooldridge, Jr. | 242/184 |
| 3,223,906 | 12/1965 | Dinger | 318/7 |
| 3,343,758 | 9/1967 | Hemdal | 242/183 |
| 3,370,802 | 2/1968 | Wooldridge et al. | 242/184 |
| 3,409,240 | 11/1968 | Moritz | 242/183 |
| 3,433,426 | 3/1969 | Brown et al. | 242/184 |
| 3,471,103 | 10/1969 | Gabor | 242/184 |
| 3,729,148 | 4/1973 | Winkler | 242/182 |

FOREIGN PATENTS OR APPLICATIONS

| | | | |
|---|---|---|---|
| 644,868 | 10/1950 | United Kingdom | 318/6 |

*Primary Examiner*—George F. Mautz
*Attorney, Agent, or Firm*—Woodcock, Washburn, Kurtz & Mackiewicz

[57] ABSTRACT

A motor control circuit automatically changes the reel motor voltage constant in response to changed operating conditions. A shunt wound D.C. reel drive motor is switched from high $K_r$, high torque, to low $K_r$, high speed, when the magnetic tape reaches a predetermined position. Tape loop position sensing switches in the slack tape vacuum column control the position of the tape loop at an upper position when the tape is being driven in one direction and at a lower position when the tape is being driven in the other position. When the tape loop goes above the upper position, or below the lower position, a switch decreases the field current to achieve a low $K_r$.

When the reel motor armature supply voltage drops below a certain level, an additional resistance is switched in parallel with the normal armature limiting resistance. This provides increased armature current to maintain the motor response time at an acceptable level even though the armature supply voltage has fallen.

8 Claims, 2 Drawing Figures

MOTOR CONTROL FOR TAPE TRANSPORT SYSTEM

BACKGROUND OF THE INVENTION

This invention relates to motor control systems for magnetic tape transports and more particularly to a control system which automatically changes the motor voltage constant in response to changed operating conditions.

High performance magnetic tape transports are extensively used in digital systems. U.S. Pat. No. 3,664,604; Aweida describes a magnetic tape transport and the control system for the reel motors.

Magnetic tape transports such as this usually include a file reel, a machine reel and a capstan for driving the magnetic tape past the head and between the file reel and the machine reel. In order to minimize the length (mass) of the tape to be accelerated by the capstan, slack tape vacuum columns are provided on each side of the head. The drive for the reel motors is controlled by tape loop position sensing switches in the columns. These can either be vacuum actuated switches as shown in the aforementioned Aweida et al. patent or photosensitive switches such as shown in Gabor U.S. Pat. No. 3,471,103.

When the tape movement is in a direction such that tape is being fed into the column, the loop in the tape is positioned at a lower null point. Tape loop positioning switches control the drive of the reel motor to maintain the tape loop at this null position. When the tape movement is in a direction such that tape is being withdrawn from the column, the loop is positioned at the upper null point. Shunt wound D.C. motors of the type commonly used in tape transports cannot have both high torque and high operating speed characteristics. The motor torque is proportional to the motor voltage constant $K_r$ but the maximum motor speed is inversely proportional to the motor voltage constant. In the prior art, the reel motor is chosen to have a $K_r$ which is low enough to allow the reel with the minimum amount of tape to keep up with the capstan. That is, the $K_r$ is the largest value which will allow the reel motor to keep up with the capstan. But the $K_r$ can be no larger. However, it is desirable to have a higher $K_r$ to accelerate the full reel up to capstan velocity. Since the motor torque constant is directly proportional to $K_r$ this must be considered in choosing a motor. However, generally it is not possible to have a motor with a $K_r$ which fully satisfies both requirements. Therefore, a compromise in performance is generally made.

Another changing operating condition frequently encountered in tape transports is a change in the power supply voltage for the reel motor armature. When the armature voltage falls below a minimum level, the motor response time may be unacceptably low. In the prior art, tap changing power supplies have been used to regulate the armature voltage supply. This requires special attention when the machine is installed in order to regulate the armature voltage to the proper level. Also, line voltage may fluctuate during actual operation so that the armature voltage may drop below the level for acceptable motor response time.

SUMMARY OF THE INVENTION

In accordance with this invention the reel motor voltage constant in a tape transport system is automatically changed in response to changed operating conditions of the magnetic tape transport. The reel motor is switched from a high torque motor voltage constant to a high speed motor voltage constant when the magnetic tape reaches a certain position in the columns.

In magnetic tape transport systems, tape loop position sensing switches in each of the vacuum columns are connected to the control system to position the tape loop at predetermined null points in the vacuum columns when tape is being driven.

In accordance with this invention, when the tape loop moves above the upper point the reel motor is switched from a high torque motor constant to a high speed motor constant so that the reel motor can keep up with the capstan. Similarly, when the tape loop moves below the lower point, the reel motor is switched from the high torque motor constant to the high speed motor constant. In this way, the reel motor is operated with high torque when the high torque is required for accelerating the reels. However, when the motor reaches a speed at which it cannot keep up with the capstan drive, the reel motor is switched to a high speed motor voltage constant.

In accordance with another important aspect of this invention, the reel motor armature current is changed in response to changes in the armature supply voltage. When the supply voltage drops, a voltage controlled switch connected across the normal armature resistance is closed. This increases the armature current and maintains the motor response time within the acceptable limits.

The foregoing and other objects, features and advantages of the invention will be better understood from the following more detailed description and appended claims.

DESCRIPTION OF A PARTICULAR EMBODIMENT

Figure 1:
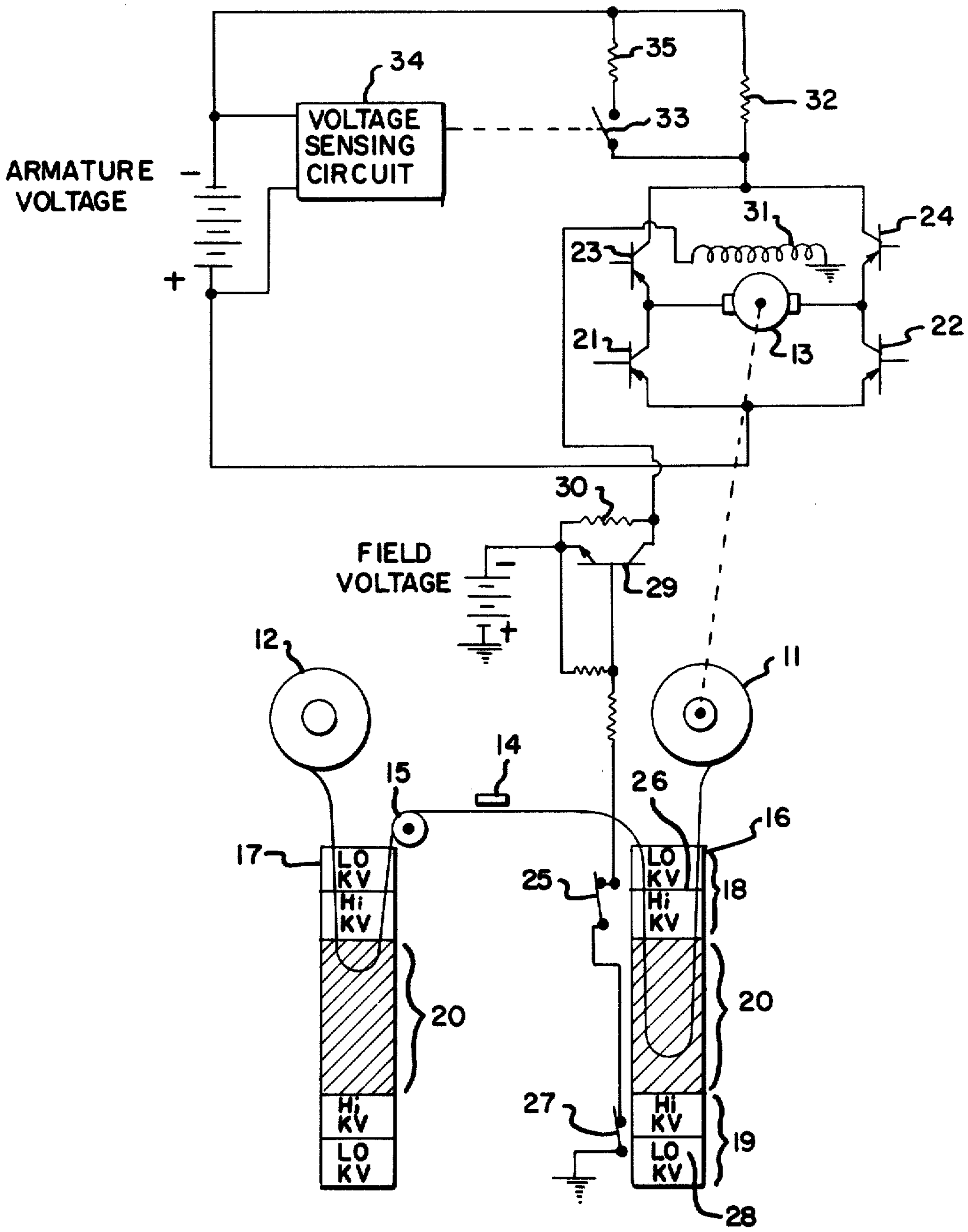
FIG. 1 shows the magnetic tape transport system and the reel motor control system of this invention.

In FIG. 1, the magnetic tape transport system includes a file reel 11 and a machine reel 12. A shunt wound D.C. motor 13 drives the file reel. A similar motor, not shown, drives the machine reel 12 and its control circuitry will be in all ways similar to that shown for the file reel drive motor 13.

A magnetic head 14 is mounted intermediate the reels. A capstan 15 drives the magnetic tape in both directions past the head and between the two reels. Slack tape vacuum columns 16 and 17 each have an open end disposed adjacent one of the reels. The vacuum columns are used to decouple the mass of the magnetic tape from the capstan. The reel motor control system maintains the tape loop in an upper drive zone 18, in a lower drive zone 19 or in a braking zone 20. A plurality of tape loop position sensing switches are spaced longitudinally of each column and are actuated as the tape loop passes over each switch. All of these loop position sensing switches are not shown. they are connected to the motor control system which includes the switching devices 21–24, usually germanium transistors. When a diagonally opposite pair of these transistors are rendered conducting, current is driven through the motor armature in one direction and when the other diagonally opposite pair is rendered conducting, current is driven through the motor in the opposite direction. Dynamic braking is achieved by rendering the lower pair of transistors conductive.

When tape is being driven into the column, the tape loop is positioned in the upper drive zone. For the column 16, the tape loop is positioned in the upper drive zone 18 when tape is being driven from file reel 11 to machine reel 12. In this way, if the tape direction is suddenly reversed by the capstan 15, the tape loop will not bottom out in the column before the file reel motor can reverse direction. Conversely, when tape is being driven out of the column the tape loop is positioned in the lower drive zone 19.

In accordance with this invention, a tape loop position sensing switch 25 detects the passage of the tape loop above a predetermined point 26 in the upper drive zone. A tape loop position sensing switch 27 detects the passage of the tape loop below a predetermined level 28 in the lower drive zone. These switches may be light sensitive switches which are effectively closed when the tape loop is not interposed between a light source and the switch, but which are otherwise open when the tape loop blocks light from the switch. Alternatively, these switches may be diaphragm-actuated switches as are well known for use in tape transport systems. As shown in FIG. 1, the switch 25 is open with the loop above the upper predetermined position and the switch 27 is open with the loop below the lower predetermined position.

Switches 25 and 27 are connected to switching means which includes the solid state switch 29. The switch 29 is connected in parallel with the normal resistance 30 of the motor field winding 31. Normally, switch 29 is conducting. A relatively high field current flows through switch 29 and the field winding 31. In this mode, the motor has a high motor voltage constant $K_v$ which is associated with a high torque. This high torque is normally necessary to accelerate the mass of tape. However, as the tape is driven up to speed, the capstan 15 will be driving the tape faster than the reel motor can go. In this case the tape loop will begin to rise and will pass above the upper predetermined point 26. When this occurs, the switch 25 is closed thereby rendering the switch 29 non-conductive. This decreases the current to the field of motor 13. Effectively this lowers the motor voltage constant $K_v$ so that the motor is switched to a high speed mode of operation. In this mode, the motor 13 is capable of operating at the same high speed as the capstan drive. That is, a higher motor rpm is obtained with the same armature voltage.

As the loop moves down in the upper drive zone 18 the position sensing switch 25 is opened, providing base current to switch 29 and saturating it. The field current is:

$$I_{Field} = \frac{V_{Field\ Supply}}{R_{Field}}$$

This allows a large value of field current and a high $K_v$.

As the loop passes above the position sensing switch 25 it closes and removes base current from switch 29, turning it off. All field current must flow through series resistance 30. Field current is now:

$$I_{Field} = \frac{V_{Field\ Supply}}{R + R_{Field}}$$

This allows a lesser value of field current and a low motor $K_v$.

The operation is similar when the tape is being driven in the other direction and the tape loop is in the lower drive zone 19.

The advantages of this arrangement are that a high motor voltage constant $K_v$ is availble to accelerate or reverse a full reel of tape. However, a low motor voltage constant $K_v$ is available to attain an rpm sufficient for an empty reel to keep up with the capstan motor. Higher tape speeds may be attained without increasing armature supply voltage which is limited by the voltage and current handling capability of the transistors 21–24 in the direction reversing switch.

The armature voltage supply is applied through a limiting resistance 32 in series with the reel motor armature. A voltage controlled switch 33 is connected in parallel with the limiting resistance 32. A circuit 34 senses the armature voltage and when this voltage drops below a certain level the switch 33 is closed thereby decreasing the resistance in series with the armature. This increases the available current to accelerate the motor. This improves the motor response time as is demonstrated by the following:

$$W = W_F\,(1 - e^{-t/K})$$

where $W$ = *motor angular velocity in RAD/SEC.*

$W_F$ = final motor angular velocity in RAD/SEC.

and where $$W_F = \frac{V_{in}}{K_v},\quad K = \frac{R_T J}{K_v K_T}$$

$V_{in}$ = available armature voltage in VOLTS
$K$ = motor response constant in SECONDS
$R_T$ = total driving resistance in OHMS
$J$ = total inertia in INCH - LBS - SEC$^2$
$K_v$ = motor voltage constant in VOLTS/RAD/SEC
$K_T$ = motor torque constant in IN-LB/AMP Note that decreasing $R_T$ or increasing available motor current improves the motor response time.

Motor $K_v$ is determined simply from the minimum available supply voltage and the minimum speed at which the motor must run in order to keep up with the capstan.

$$K_{vmax} = \frac{V_{s\,minimum}}{W_{f\,minimum}}$$

When the motor response time falls below the acceptable level due to low supply voltage, resistance 35 is placed in parallel with resistance 32 improving response time.

Figure 2:
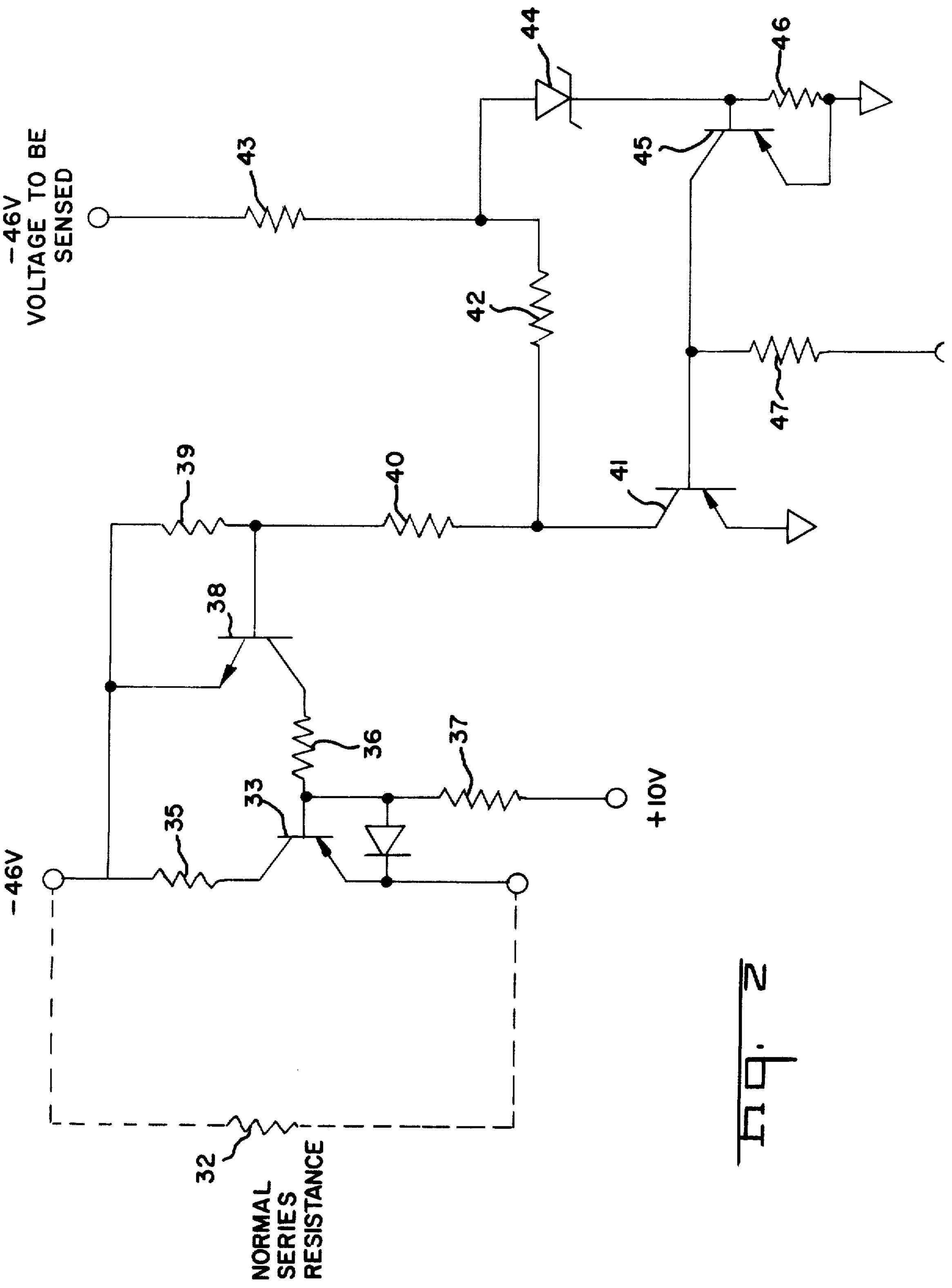
FIG. 2 shows the circuitry of the voltage controlled switch for the armature.

A typical voltage sensing circuit and voltage sensitive switch are shown in FIG. 2. The following circuit components are given by way of example only:

| | |
|---|---|
| resistance 32 | 0.5 ohms |
| switch 33 | 2N4053 |
| resistance 35 | 1 ohm |
| resistance 36 | 10 ohms |
| resistance 37 | 300 ohms |
| transistor 38 | 2N4348 |
| resistance 39 | 100 ohms |
| resistance 40 | 300 ohms |
| transistor 41 | 2N5322 |
| resistance 42 | 15K |
| resistance 43 | 300 ohms |

-Continued

| | |
|---|---|
| Zener diode 44 | 1N5366 |
| transistor 45 | 2N4355 |
| resistor 46 | 470 ohms |
| resistor 47 | 120 ohms |

The diode 44 determines the voltage level at which switch 33 is rendered conductive. The resistance 42 provides positive feedback and a small voltage hysteresis thereby determining the voltage level at which the switch goes off.

This field winding switch provides improved motor performance over a varying line voltage range. It eliminates the need for costly linear or switching type regulators for the armature voltage. It provides faster response time than switching regulators or silicon controlled rectifier A.C. commutated regulators. It does not require increased supply voltage to obtain a motor response increase. Also, it reduces the strain on the power transistors 21–24 by increasing the series resistance at high line voltages.

While a particular embodiment of the invention has been shown and described, various modifications will be apparent to those skilled in the art. The appended claims are, therefore, intended to cover any such modifications.

What is claimed is:

1. A magnetic tape transport system comprising:

a file reel and a machine reel;

a drive motor for said file reel and a drive motor for said machine reel, a magnetic head mounted intermediate said reels, a capstan means for driving said tape past said head and between said reels, a pair of slack tape vacuum columns each having an open end disposed adjacent each of said reels on opposite sides of said head, and each having a closed end, tape loop position sensing switches associated with each of said slack vacuum columns, for producing a switching signal in response to the approach by said tape to a predetermined distance from either said open or said closed end of each of said columns, a control system for each reel drive motor, means in said control system responsive to said switching signal for switching the field of a drive motor between a high torque motor voltage contant to a high speed motor voltage constant.

2. The magnetic tape transport system recited in claim 1 wherein said drive motor has a field winding and wherein said means for switching comprises:

an electronic switch connected to said field winding for changing the rated field current of said drive motor.

3. The tape transport system recited in claim 1 further comprising:

tape loop position sensing switches spaced longitudinally of each column and actuated as the tape loop passes over each switch, said tape loop position sensing switches being connected to said control system to maintain said tape loop in an upper drive zone when said motor is driving tape in one direction, and in a lower drive zone when said drive motor is driving tape in the other direction, an upper tape loop position sensing switch at an upper predetermined point in said upper drive zone, a lower tape loop position sensing switch at a lower predetermined point in said lower drive zone, said upper and lower tape loop position sensing switches being connected to said switching means to decrease said motor voltage constant when said tape loop is above said upper predetermined point or below said lower predetermined point.

4. The tape transport system recited in claim 3 wherein said motor has a field winding, wherein said switching means is connected to said field winding and wherein said upper and lower tape loop position sensing switches are connected to decrease the current through said field winding when said tape loop is above said upper predetermined point or below said lower predetermined point.

5. The tape transport recited in claim 4 wherein said switching means comprises:

an electronic switching device in parallel with an external resistor both of which are in series with the field of said drive motor, said upper tape loop position sensing switch being connected to turn said solid state switching device off when said tape loop is above said upper predetermined position, said lower tape loop position sensing switch being connected to turn said solid state switching device off when said tape loop is below said lower predetermined position.

6. A magnetic tape transport system comprising:

a file reel and a machine reel, a drive motor for said file reel and a drive motor for said machine reel, a magnetic head mounted intermediate said reels, capstan means for driving said tape past said head and between said reels, means for sensing said reel motor supply voltage, and means responsive to said sensing means and connected to the motor armature for increasing the armature current when said reel motor supply voltage drops below a given value.

7. The tape transport system recited in claim 6 wherein said means connected to the motor armature comprises:

a limiting resistance in series with said drive motor armature, and a voltage controlled switch in parallel with said limiting resistance, said sensing means being connected to close said switch when said armature voltage drops below a given value thereby decreasing the resistance in series with said armature and increasing said motor armature current.

8. The tape transport recited in claim 7 wherein said voltage controlled switch includes an electronic switching device, said reel motor armature voltage being applied to said electronic switching device to turn said switching device on when said reel motor armature voltage drops below a predetermined level.

* * * * *